United States Patent
Yang et al.

(10) Patent No.: US 8,031,405 B2
(45) Date of Patent: Oct. 4, 2011

(54) OPTICAL ADJUSTING APPARATUS WITH COMPOSITE PATTERN STRUCTURE

(75) Inventors: Jauh-jung Yang, Sinwu (TW); Chi-feng Chen, Sinwu (TW)

(73) Assignee: Dayu Optoelectronics, Sinwu Township (TW)

( * ) Notice: Subject to any disclaimer, the term of this patent is extended or adjusted under 35 U.S.C. 154(b) by 121 days.

(21) Appl. No.: 12/423,979

(22) Filed: Apr. 15, 2009

(65) Prior Publication Data

US 2010/0265588 A1    Oct. 21, 2010

(51) Int. Cl.
*G02B 27/10* (2006.01)
*G03B 21/60* (2006.01)
*G03B 21/56* (2006.01)

(52) U.S. Cl. .................. 359/621; 359/443; 359/455

(58) Field of Classification Search .......... 359/618–626, 359/454–456, 443
See application file for complete search history.

(56) References Cited

U.S. PATENT DOCUMENTS

| | | | |
|---|---|---|---|
| 2006/0221630 A1* | 10/2006 | Lee | 362/561 |
| 2007/0010594 A1* | 1/2007 | Wang et al. | 522/182 |
| 2008/0019146 A1* | 1/2008 | Wang et al. | 362/606 |
| 2008/0055937 A1* | 3/2008 | Chuang et al. | 362/627 |
| 2010/0020262 A1* | 1/2010 | Hong et al. | 349/62 |
| 2010/0295762 A1* | 11/2010 | Yeom et al. | 345/87 |

* cited by examiner

*Primary Examiner* — Dawayne A Pinkney
(74) *Attorney, Agent, or Firm* — Kirton & McConkie; Evan R. Witt

(57) ABSTRACT

An optical adjusting apparatus having a composite pattern structure is described. The optical adjusting apparatus include a substrate layer, at least one first pattern module and at least one second pattern module. The substrate has a first optical surface and a second optical surface opposite to the first optical surface. The first pattern module positioned on the first optical surface, wherein the first pattern module has a first structure unit along a first arrangement direction. The second pattern module which is adjacent to the first pattern module and positioned on the first optical surface. The second pattern module has the second structure unit along a second arrangement direction. The first structure unit of the first pattern module is connected to the second structure unit of the second pattern module. Therefore, the convergent angle of a light module is adjusted and the brightness of the light module is increased along specific direction.

18 Claims, 7 Drawing Sheets

OPTICAL ADJUSTING APPARATUS WITH COMPOSITE PATTERN STRUCTURE

FIELD OF THE INVENTION

The present invention relates to an optical adjusting apparatus, and more particularly to an optical adjusting apparatus having a composite pattern structure wherein the composite pattern structure includes at least two pattern modules with at least two arrangement directions for increasing the luminance of a light source and for adjusting the convergent angle of the light beam issued from the light source.

BACKGROUND OF THE INVENTION

Conventionally, a brightness enhancement film (BEF) is widely used in a light module to concentrate a light beam generated by a light source. Specifically, the brightness enhancement film (BEF) is applicable to the display monitor to meet the requirement for higher luminance or to the display supplied with a battery set. Such an application attempts to reuse the light outside the visual angle of the user by reflecting the light beam along the direction of the user in order to increase the usage efficiency of the light source.

The brightness enhancement film (BEF) is composed of prism sheets for centralizing the light beam and the prism sheets are arranged by an array of prisms in single direction. The arrangement of the array prisms is regular and monotone. Since the array prisms are only positioned in a simplex direction, the visual angle of the user cannot be properly changed to meet the requirement of the display standards. In addition, the availability of the concentration of the light beam is decreased due to the regular arrangement along single direction, thereby downgrading to the usability of the light module. Consequently, there is a need to develop an optical adjusting apparatus for solving the aforementioned problems.

SUMMARY OF THE INVENTION

The first objective of the present invention is to provide an optical adjusting apparatus having composite pattern structure for concentrating the light beam from the light source.

The second objective of the present invention is to provide an optical adjusting apparatus having composite pattern structure for adjusting the angle of light emission of the light source. According to the above objectives, the present invention sets forth an optical adjusting apparatus having composite pattern structure. The optical adjusting apparatus include a substrate layer, at least one first pattern module and at least one second pattern module. The optical adjusting apparatus having a composite pattern structure for adjusting the convergent angle of a light module and increasing brightness of the light module. The substrate has a first optical surface and a second optical surface opposite to the first optical surface. The first pattern module is positioned on the first optical surface and has at least one first structure unit along a first arrangement direction. The second pattern module is adjacent to the first pattern module and positioned on the first optical surface. The second pattern module has at least one second structure unit along a second arrangement direction. The first arrangement direction of the first structure units and the second arrangement direction of the second structure units therebetween have a predetermined angle for adjusting a convergent angle of a light beam from the second optical surface to the first optical surface of the substrate layer.

The present invention provides an optical adjusting apparatus for adjusting the convergent angle of a light module and increasing brightness of the light module. The optical adjusting apparatus includes pattern modules having a plurality of geometric shapes and each of the pattern modules is composed of a plurality optical structure units. The structure direction of the adjoining pattern modules has at least two arrangement directions. When the light beam enters the optical adjusting apparatus, the total internal reflection is generated by the optical adjusting apparatus for adjusting the convergent angle of the light beam away from the optical adjusting apparatus and for concentrating the light beam. Moreover, another feature of the optical adjusting apparatus is the control of the area of the pattern modules for dominating the output angle, thereby adjusting the angle light emission of the display system.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
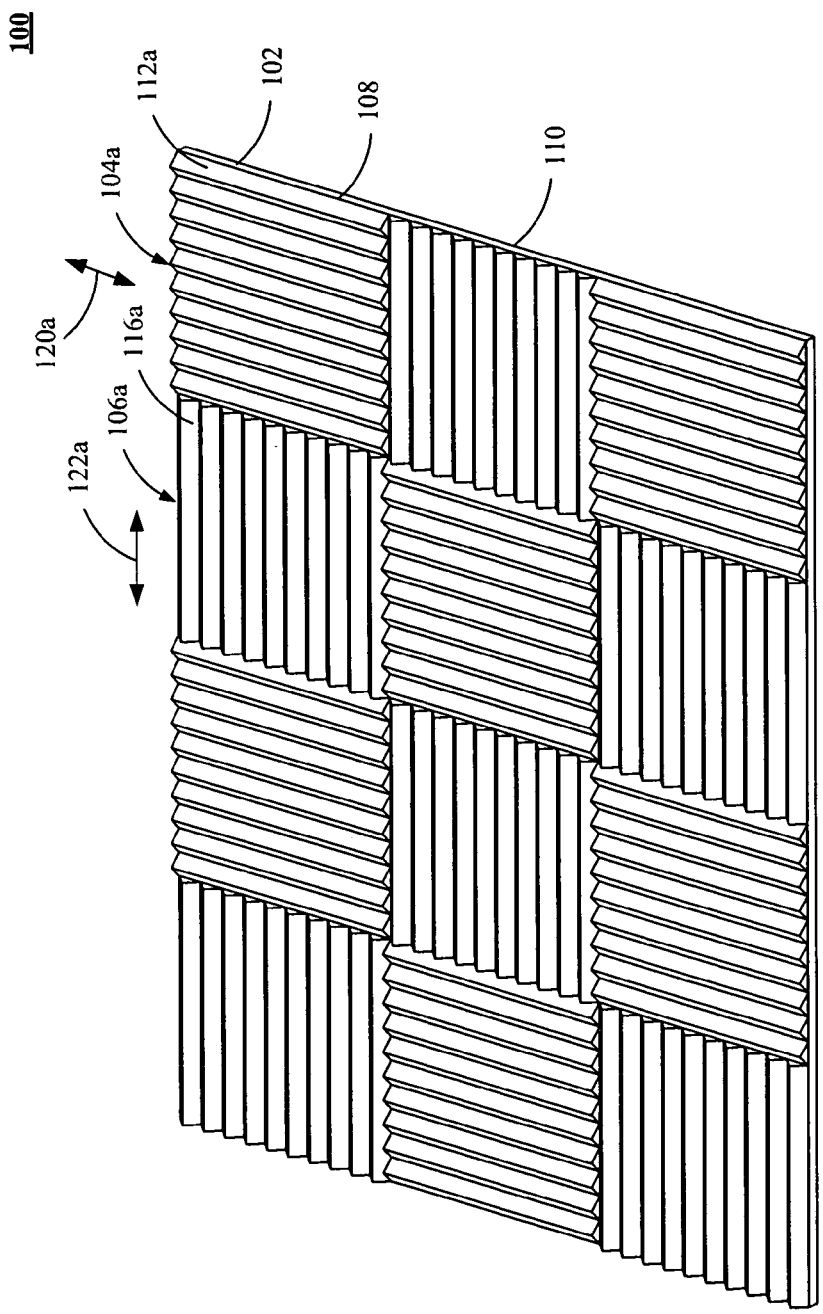
FIG. 1 is a schematic view of an optical adjusting apparatus according to a first embodiment of the present invention.

FIG. 1 is a schematic view of an optical adjusting apparatus 100 according to a first embodiment of the present invention. The optical adjusting apparatus 100 include a substrate layer 102, a plurality of first pattern modules 104a and a plurality of second pattern modules 106a. The optical adjusting apparatus 100 has a composite pattern structure for adjusting the convergent angle of a light module and increasing brightness of the light module within the convergent angle. The substrate layer 102 has a first optical surface 108 and a second optical surface 110 which is opposite to the first optical surface 108. The first pattern modules 104a are positioned on the first optical surface 108 and each of the first pattern modules 104a has a plurality of first structure units 112a along a first arrangement direction 120a. That is, the first arrangement direction 120a indicates the placement direction of the first pattern modules 104a. The second pattern modules 106a are adjacent to the first pattern modules 104a and each of the second pattern modules 106a is positioned on the first optical surface 108. Each of the second pattern modules 106a has a plurality of second structure units 116a along a second arrangement direction 122a. That is, the second arrangement direction 122a indicates the placement direction of the second pattern modules 106a. The first arrangement direction 120a of the first structure units 112a and the second arrangement direction 122a of the second structure units 116a therebetween have a predetermined angle for adjusting a convergent angle of a light beam from the second optical surface 110 to the first optical surface 108 of the substrate layer 102. The first arrangement direction 120a of the first pattern modules 104a is different from the second arrangement direction 122a of the second pattern modules 106a on the first optical surface 108. In one case, the first pattern module 104a and the second pattern module 106a are quadrilateral shape, as shown in FIG. 1. The predetermined angle between the first arrangement direction 120a of the first pattern module 104a and the second arrangement direction 122a of the second pattern module 106a has a range from 0 to 30 degrees.

Figure 2:
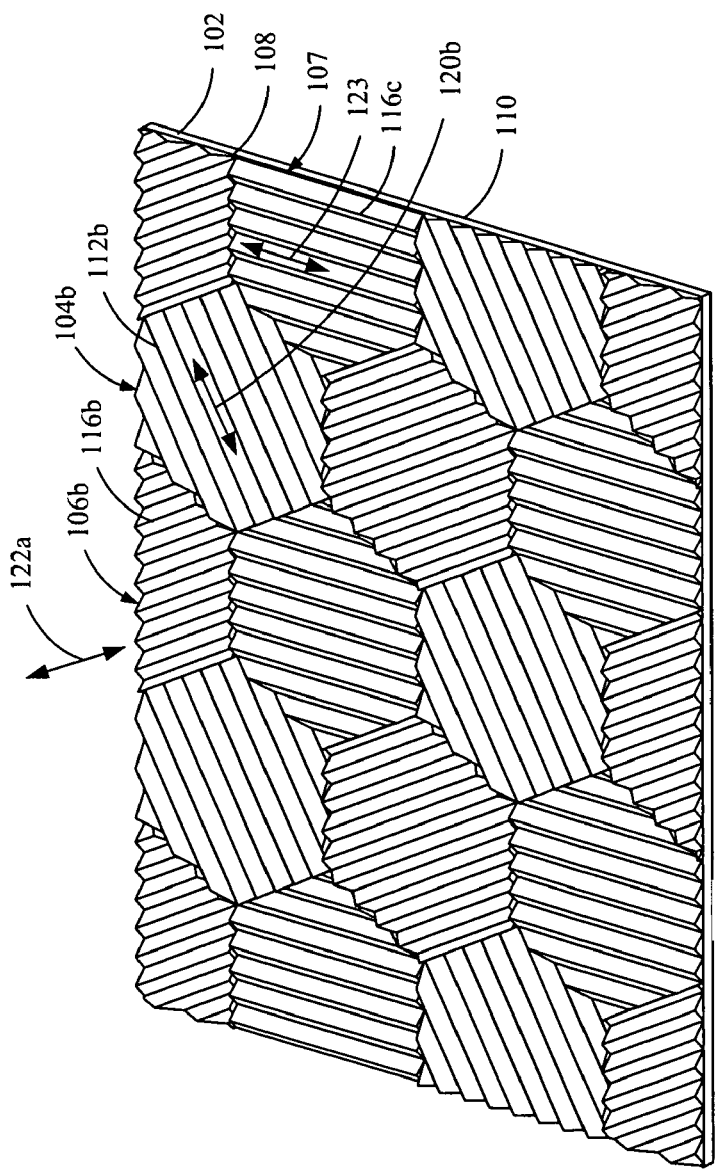
FIG. 2 is a schematic view of the optical adjusting apparatus according to a second embodiment of the present invention.

FIG. 2 is a schematic view of an optical adjusting apparatus 200 according to a second embodiment of the present invention. The optical adjusting apparatus 200 is similar to the optical adjusting apparatus 100 shown in FIG. 1. The difference between the optical adjusting apparatus 200 and the optical adjusting apparatus 100 is the shape and arrangement of pattern module. The optical adjusting apparatus 200 include a substrate layer 102, a plurality of first pattern modules 104b, a plurality of second pattern modules 106b, and a plurality of third pattern modules 107. The substrate layer 102 has a first optical surface 108 and a second optical surface 110 opposite to the first optical surface 108. The first pattern modules 104b are positioned on the first optical surface 108 and each of the first pattern modules 104b has a plurality of first structure units 112b along a first arrangement direction 120b. The second pattern modules 106b are adjacent to the first pattern modules 104b and positioned on the first optical surface 108. Each of the second pattern modules 106b has a plurality of second structure units 116b along a second arrangement direction 122b. The third pattern module 107 is adjoined to the first pattern module 104b and the second pattern module 106b and positioned on the first optical surface 108. The third pattern module 107 has a plurality of third structure units 116c along a third arrangement direction 123.

On the first optical surface 108, the first arrangement direction 120b of the first pattern module 104b, the second arrangement direction 122b of the second pattern module 106b, and the third arrangement direction 123 of the third pattern module 107 are different. The first arrangement direction 120b of the first structure units 112b, the second arrangement direction 122b of the second structure units 116b, and the third arrangement direction 123 of the third pattern module 107 therebetween have predetermined angles for adjusting a convergent angle of a light beam from the second optical surface 110 to the first optical surface 108 of the substrate layer 102. In one case, the first pattern module 104b, the second pattern module 106b and the third pattern module 117 are hexagonal shape. In one embodiment, the angle among the first arrangement direction 120b of the first pattern module 104b, the second arrangement direction 122b of the second pattern module 106b and the third arrangement direction 123 of the third pattern module 117 ranges from 0 degree to 30 degrees. Preferably, the angle among the first arrangement direction 120b, the second arrangement direction 122b and the third arrangement direction 123 is 15 degrees.

As shown in FIG. 1 and FIG. 2, the first pattern module 104a, 104b has arbitrary geometric shape. Further, the first pattern module 104a, 104b is composed of first structure units 112a, 112b having different shapes. The second pattern module 106a, 106b has an arbitrary geometric shape. Further, the second pattern module 106a, 106b is composed of the second structure units 116a, 116b having different shapes. The third pattern module 117 has an arbitrary geometric shape. Further, the third pattern module 117 is composed of the third structure units 116c having different shapes. In other words, the first pattern modules 1041, 104b, the second pattern modules 106a, 106b, and/or the third pattern modules 117 respectively have an arbitrary geometric shape to be matched therebetween. Based on the total internal reflection mechanism of the first pattern modules 104a, 104b, the second pattern modules 106a, 106b, and/or the third pattern modules 117, the light beam is concentrated by the first structure units 112a, 112b, the second structure units 116a, 117b, and/or the third structure units 116c along a variety of arrangement directions for converging the light beam to adjust the convergent angle.

In comparison with conventional two film layers on the substrate, the optical adjusting apparatus 100, 200 in the present invention utilizes a single layer including a plurality of first pattern modules 104a and a plurality of second pattern modules 106a and/or the third pattern modules 117 for saving the manufacturing cost of the light module. Moreover, the arrangement directions and the area of the pattern modules can be adjusted to effectively control the convergent angle of the light beam. In other words, the areas of the first pattern module 104a, 104b, the second pattern module 106a, 106b, and/or the third pattern module 107 are adjusted to modify the convergent angle of the light beam through the first optical surface 108.

Figure 3A:
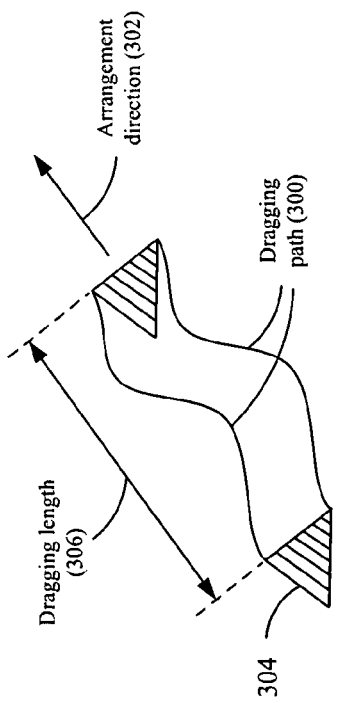
FIG. 3A is schematic view of dragging a two-dimensional cross-section pattern to form a structure unit via a dragging path along an arrangement direction according to one embodiment of the present invention.
Figure 3B:
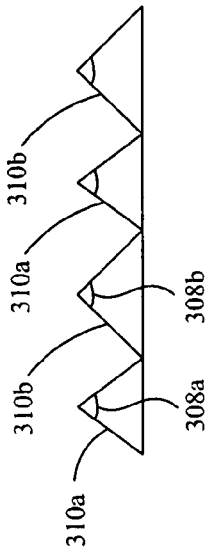
FIG. 3B is schematic views of two-dimensional cross-section patterns for constructing the optical adjusting apparatus according to four embodiments of the present invention.

Please refer to FIGS. 3A and 3B. FIG. 3A is schematic view of dragging a two-dimensional cross-section pattern 304 to form a structure unit via a dragging path 300 along an arrangement direction 302 according to one embodiment of the present invention. FIG. 3B is schematic views of two-dimensional cross-section patterns for constructing the optical adjusting apparatus according to four embodiments of the present invention. In FIG. 3A, each of the first structure units is a three-dimensional structure which is constructed by dragging a first two-dimensional cross-section pattern 304, e.g. triangular pattern, via a first dragging path along the first arrangement direction. Each of the second structure units includes a three-dimensional structure which is constructed by a second two-dimensional cross-section pattern, e.g. triangular pattern, via a second dragging path along the second arrangement direction. In one embodiment, the size of the two-dimensional pattern 304 on the substrate layer 102 is the range from 10 μm to 500 μm to improve the convergent efficiency of the optical adjusting apparatus.

The first dragging path of first structure unit and the second dragging path of the second structure unit are selected from one group consisting of a straight line-type, a curved line-type, and a line-type generated by a trigonometric function. For example, the first dragging path along the first arrangement direction and the second dragging path along the second arrangement direction are a straight line-type, respectively. The first dragging path along the first arrangement direction and the second dragging path along the second arrangement direction are a curved line-type, respectively. The first dragging path along the first arrangement direction and the second dragging path along the second arrangement direction are a line-type which is generated by a trigonometric function, respectively. The first dragging path along the first arrangement direction is a straight line-type and the second dragging path along the second arrangement direction is a line-type which is generated by a trigonometric function. In one embodiment, the starting point and an end point of the three-dimensional structure is generated along the first arrangement direction and the second arrangement direction. That is, the dragging path is along the dragging direction to generate a structure having a dragging length 306.

In FIG. 3B, The first and second two-dimensional cross-section patterns respectively are selected from one group consisting of a triangular pattern, a semi-circular pattern, a parabolic curve pattern, and a triangular and parabolic curve pattern, and an arbitrary closed-type profile.

Figure 3C:
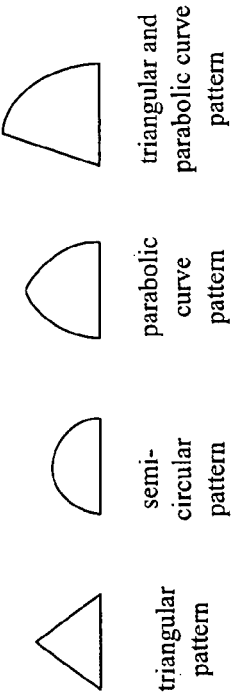
FIG. 3C is schematic view of structure units having different vertex angles for constructing the optical adjusting apparatus according to one embodiment of the present invention.

Please refer to FIG. 3C. FIG. 3C is schematic view of structure units having different vertex angles for constructing the optical adjusting apparatus according to one embodiment of the present invention. A first vertex angle 308a of each of the first structure units 310a is different from a second vertex angle 308b of each of the second structure units 310b. In one embodiment, the first vertex angle 308a of each of the first structure units 310a and the second vertex angle 308b of each of the second structure units 310b have a range from 90 to 100 degrees. In this case, the first structure units 310a and the second structure units 310b include a triangular pattern. In another case, the first vertex angle has a first arc-shape and the second vertex angle has a second arc-shape which is different from the first arc-shape. The first vertex angle has a first arc-shape and the second vertex angle has a second arc-shape which is the same as the first arc-shape. The first structure units 310a in the first pattern modules and the second structure units in the second pattern modules are positioned in a regular arrangement. Alternatively, the first structure units 310a in the first pattern module and the second structure units 310b in the second pattern module are positioned in an irregular arrangement.

Figure 4B:
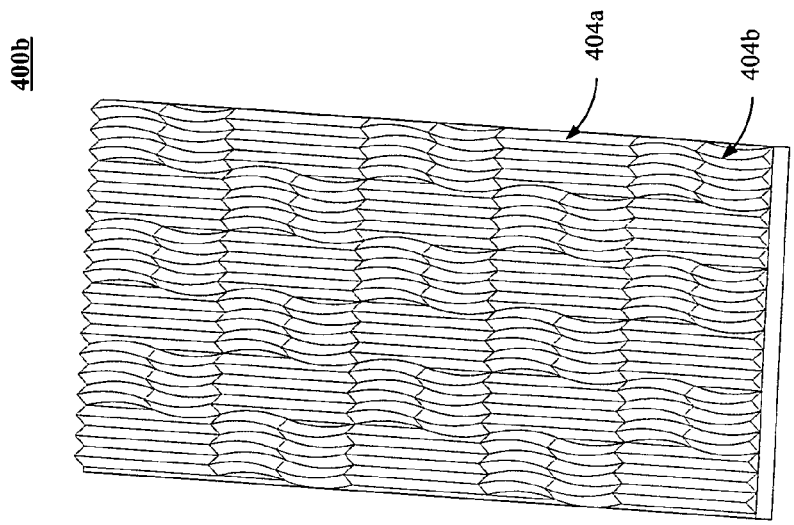
FIGS. 4A-4C are schematic views of the optical adjusting apparatuses according to three embodiments of the present invention.
Figure 4A:
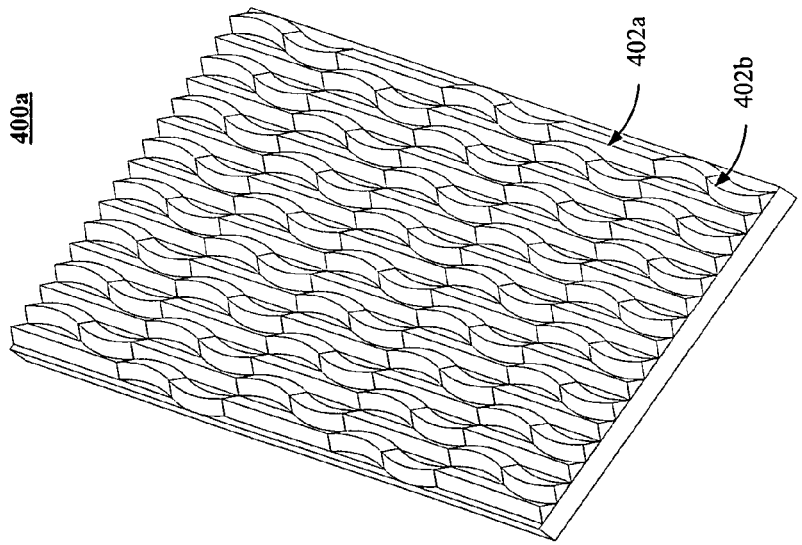
Figure 4C:
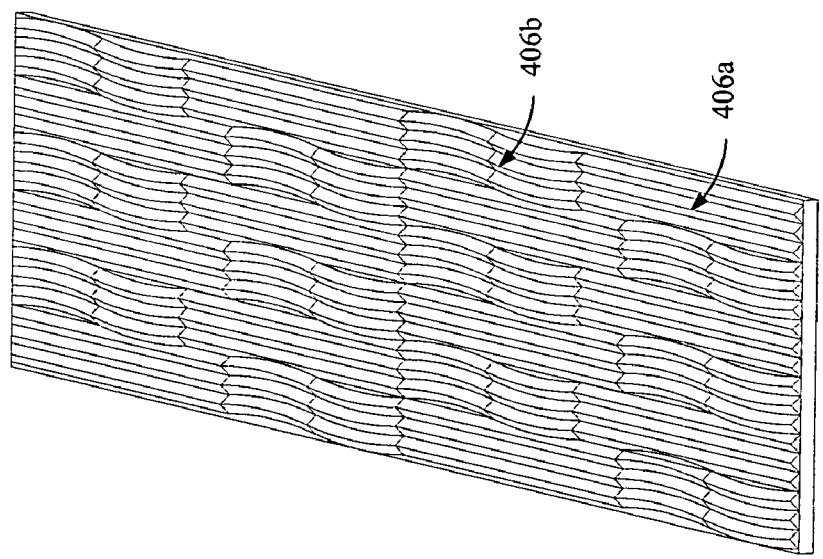

FIGS. 4A-4C are schematic views of the optical adjusting apparatuses 400a, 400b, and 400c according to three embodiments of the present invention. The optical adjusting apparatus 400a, 400b, and 400c are similar to the optical adjusting apparatuses 100, 200 shown in FIGS. 1 and 2. The main difference between the optical adjusting apparatus 400a, 400b, and 400c and the optical adjusting apparatus 200 is the dragging path of the pattern module. As shown in FIGS. 1 and 2, the dragging paths of structure units of the pattern modules 104a, 106a, 104b, 104c, 107 is straight line-type. As shown in FIGS. 4A-4C, the dragging paths in the pattern modules 402a, 402b is the combinations of straight line-type and curved line-type.

In FIG. 4A, each pattern module 402a or 402b has only a structure unit, respectively. The dragging path of the structure unit in the first pattern module 402a is straight line-type, and dragging path of the structure unit in the second pattern module 402b is a line-type which is generated by a trigonometric function. The first pattern module 402a and the second pattern module 402b are arranged by interlaced profiles. Further, each of the structure units of the first pattern module 402a is continuously connected to each of the structure units of the second pattern module 402b.

Similarly, in FIGS. 4B and 4C, each pattern module 402a or 402b has plurality of structure units, respectively. In this case, the number of structure unit of the first pattern module 402a and the second pattern module 402b is three. In another case, the number of structure unit can be two or more than three. The dragging path of the structure unit in the first pattern module 404a is straight line-type, and dragging path of the structure unit in the second pattern module 404b is a line-type which is generated by a trigonometric function. The first pattern module 404a and the second pattern module 404b are arranged by interlaced profiles and identical lengths, as shown in FIG. 4B. The first pattern module 406a and the second pattern module 406b are arranged by interlaced profiles and varied lengths, as shown in FIG. 4C. Further, each of the structure units of the first pattern modules 404a, 406a is continuously connected to each of the structure units of the second pattern module 404b, 406b.

In FIGS. 4A-4C, the predetermined angle among the first arrangement direction of the first pattern module and the second arrangement direction of the second pattern module ranges from 0 degree to 30 degrees. Preferably, the predetermined angle between the first arrangement direction and the second arrangement direction is 10 degrees. The first pattern module 402a, 404a, 406a and the second pattern module 402b, 404b, 406b are quadrilateral shape or the shape has the arbitrary number of edges.

In addition, as shown in FIGS. 1-2, and 4A-4C, the first pattern module 104a, 104b, the second pattern module 106a, 106b and the third pattern module 107 respectively have an arbitrary geometric shape to be matched therebetween. Further, the areas of the first pattern module 104a, 104b, the second pattern module 106a, 106b and the third pattern module 107 respectively are adjusted to further modify the convergent angle of a light beam of the first optical surface.

Figure 5A:
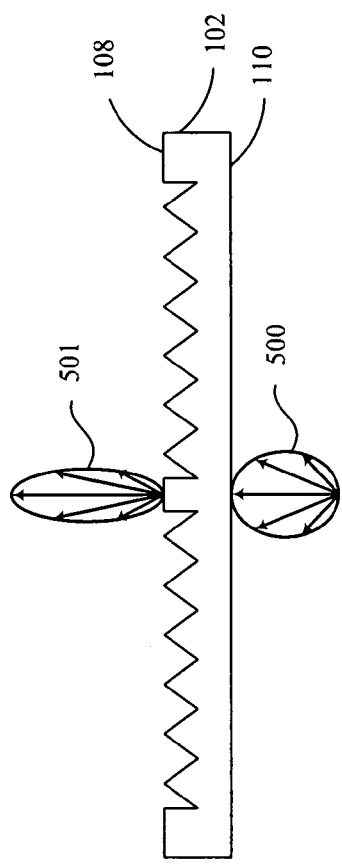
FIGS. 5A-5B illustrate cross-sectional views of issuing the light beam to the optical adjusting apparatuses according to one embodiment of the present invention.
Figure 5B:
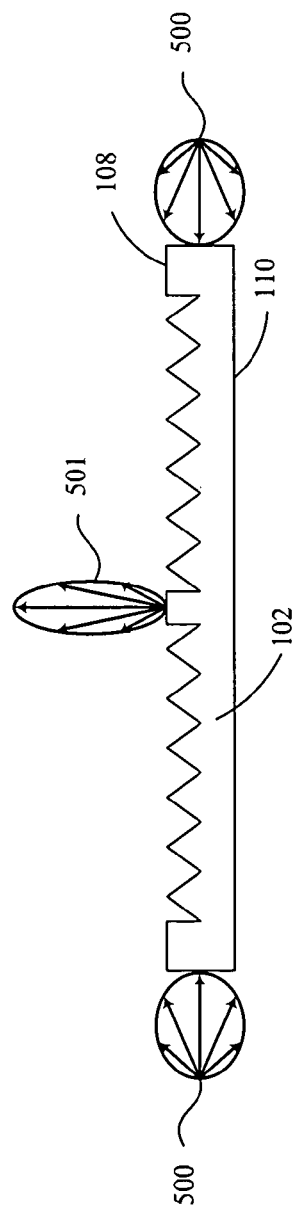

Please refer to FIG. 1 and FIGS. 5A-5B. FIGS. 5A-5B illustrate cross-sectional views of issuing the light beam to the optical adjusting apparatuses according to one embodiment of the present invention. In FIG. 5A, the light beam 500 from the light source penetrates into the substrate layer 102 from the second optical surface 110 to the first optical surface 108. In FIG. 5B, the light beam 500 from the light source penetrates into the substrate layer 102 via one lateral side or two lateral sides of the substrate layer 102. The output light beam 501 is convergent. In one embodiment, the refraction index of the first structure unit 112a, 112b of the first pattern module 104a, 104b and the second structure unit 116a, 116b of the second pattern module 106a, 106b on the substrate layer 102 is greater than one so that the light beam 500 generates the total internal reflection within the substrate layer 102.

Figure 6A:
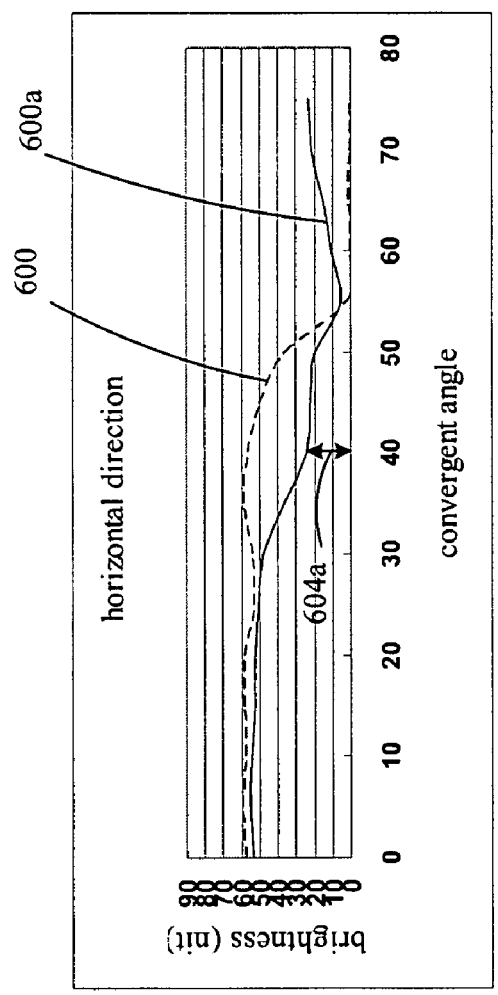
FIGS. 6A-6B are schematic profiles of the convergent angle corresponding to the brightness of the optical adjusting apparatus according to one embodiment of the present invention.
Figure 6B:
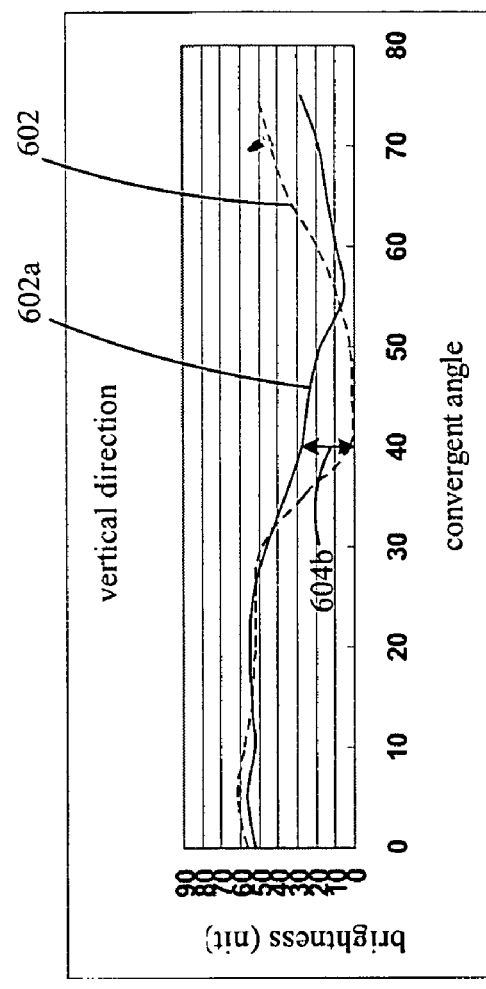

Please refer to FIGS. 1, 6A-6B. FIGS. 6A-6B are schematic profiles of the brightness and convergent angle of the light beam of the optical adjusting apparatuses according to one embodiment of the present invention. In FIG. 6A, the horizontal axis represents the convergent angle of the light beam along the horizontal direction shown in FIG. 1. The vertical axis represents the brightness corresponding to the convergent angle along the horizontal direction shown in FIG. 1. In FIG. 6B, the horizontal axis represents the convergent angle of the light beam along the vertical direction shown in FIG. 1. The vertical axis represents the brightness corresponding to the convergent angle along the vertical direction shown in FIG. 1.

In FIG. 6A, curve 600 represents the conventional convergent angle and brightness of the light beam along one direction. The curve 600a represents the proposed convergent angle and brightness of the light beam along the horizontal direction. In FIG. 6B, curve 602 represents another conventional convergent angle and brightness of the light beam along one direction. The curve 602a represents another proposed convergent angle and brightness of the light beam along the vertical direction.

Conventionally, the brightness and intensity of curve 600 at the angle (e.g. 40 degrees) of full width at half maximum is different the brightness and intensity of curve 602 at the angle (e.g. 40 degrees) of full width at half maximum. Conversely, the brightness and intensity of curve 600a at the angle (e.g. 40 degrees) of full width at half maximum is the same as the brightness and intensity of curve 602a at the angle (e.g. 40 degrees) of full width at half maximum. In other words, the light beam is diffused at the vertical and horizontal directions. Basically, the convergent angle along the horizontal direction is decreased and the convergent angle along the horizontal direction is increased. Additionally, the optical adjusting apparatus is capable of adjusting the area of the pattern module to modify the brightness at different directions, e.g. vertical and horizontal directions. Further, the arrangement directions can be increased to diffuse the light beam at different directions.

According to the above-mentioned descriptions, the present invention provides an optical adjusting apparatus for adjusting the convergent angle of a light module and increasing brightness of the light module. The optical adjusting apparatus includes pattern modules having a plurality of geometric shapes and each of the pattern modules is composed of a plurality optical structure units. The structure direction of the adjoining pattern modules has at least two arrangement directions. When the light beam enters the optical adjusting apparatus, the total internal reflection is generated by the optical adjusting apparatus for adjusting the convergent angle of the light beam away from the optical adjusting apparatus and for concentrating the light beam. Moreover, another feature of the optical adjusting apparatus is the control of the area of the pattern modules for dominating the output angle, thereby adjusting the angle light emission of the display system.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. An optical adjusting apparatus having a composite pattern structure, the optical adjusting apparatus comprising:
a substrate layer having a first optical surface and a second optical surface opposite to the first optical surface;
at least one first pattern module positioned on the first optical surface of the substrate layer, wherein the at least one first pattern module has a plurality of first structure units along a first arrangement direction; and
at least one second pattern module which is adjacent to the at least one first pattern module and positioned on the first optical surface of the substrate layer, wherein the at least one second pattern module has a plurality of second structure units along a second arrangement direction, and wherein the first arrangement direction of the first structure units and the second arrangement direction of the second structure units therebetween have a predetermined angle for adjusting a convergent angle of a light beam from the second optical surface to the first optical surface of the substrate layer, and the predetermined angle between the first arrangement direction and the second arrangement direction has wherein areas of the at least one first pattern module and the at least one second pattern module respectively are adjusted to further modify the convergent angle of a light beam of the first optical surface.

2. The optical adjusting apparatus of claim 1, wherein each of the first structure units comprises a three-dimensional structure which is constructed by a first two-dimensional cross-section pattern via a first dragging path along the first arrangement direction.

3. The optical adjusting apparatus of claim 2, wherein each of the second structure units comprises a three-dimensional structure which is constructed by a second two-dimensional cross-section pattern via a second dragging path along the second arrangement direction.

4. The optical adjusting apparatus of claim 3, wherein the first and second two-dimensional cross-section patterns respectively are selected from one group consisting of a triangular pattern, a semi-circular pattern, a parabolic curve pattern, and a triangular and parabolic curve pattern.

5. The optical adjusting apparatus of claim 3, wherein the first dragging path along the first arrangement direction and the second dragging path along the second arrangement direction are a straight line-type, respectively.

6. The optical adjusting apparatus of claim 3, wherein the first dragging path along the first arrangement direction and the second dragging path along the second arrangement direction are a curved line-type, respectively.

7. The optical adjusting apparatus of claim 3, wherein the first dragging path along the first arrangement direction and the second dragging path along the second arrangement direction are a line-type which is generated by a trigonometric function, respectively.

8. The optical adjusting apparatus of claim 3, wherein the first dragging path along the first arrangement direction is a straight line-type and the second dragging path along the second arrangement direction is a line-type which is generated by a trigonometric function.

9. The apparatus of claim 1, wherein each of the first structure units and the second structure units respectively have a refraction index which is greater than one.

10. The optical adjusting apparatus of claim 1, wherein the at least one first pattern module and the at least one second pattern module respectively have an arbitrary geometric shape to be matched therebetween.

11. The optical adjusting apparatus of claim 1, wherein each of the first structure units of the at least one first pattern module is connected to each of the second structure units of the at least one second pattern module.

12. The optical adjusting apparatus of claim 1, wherein a first vertex angle of each of the first structure units is different from a second vertex angle of each of the second structure units.

13. The optical adjusting apparatus of claim 12, wherein the first vertex angle of each of the first structure units and the second vertex angle of each of the second structure units have a range from 90 to 100 degrees.

14. The optical adjusting apparatus of claim 12, wherein the first vertex angle has a first arc-shape and the second vertex angle has a second arc-shape which is different from the first arc-shape.

15. The optical adjusting apparatus of claim 12, wherein the first vertex angle has a first arc-shape and the second vertex angle has a second arc-shape which is the same as the first arc-shape.

16. The optical adjusting apparatus of claim 12, wherein the first structure units in the at least one first pattern module and the second structure units in the at least one second pattern module are positioned in a regular arrangement.

17. The optical adjusting apparatus of claim 12, wherein the first structure units in the at least one first pattern module and the second structure units in the at least one second pattern module are positioned in an irregular arrangement.

18. The optical adjusting apparatus of claim 1, wherein the length of each of the first structure units is varied, and the length of each of the second structure units is different.

* * * * *